Figure 1:
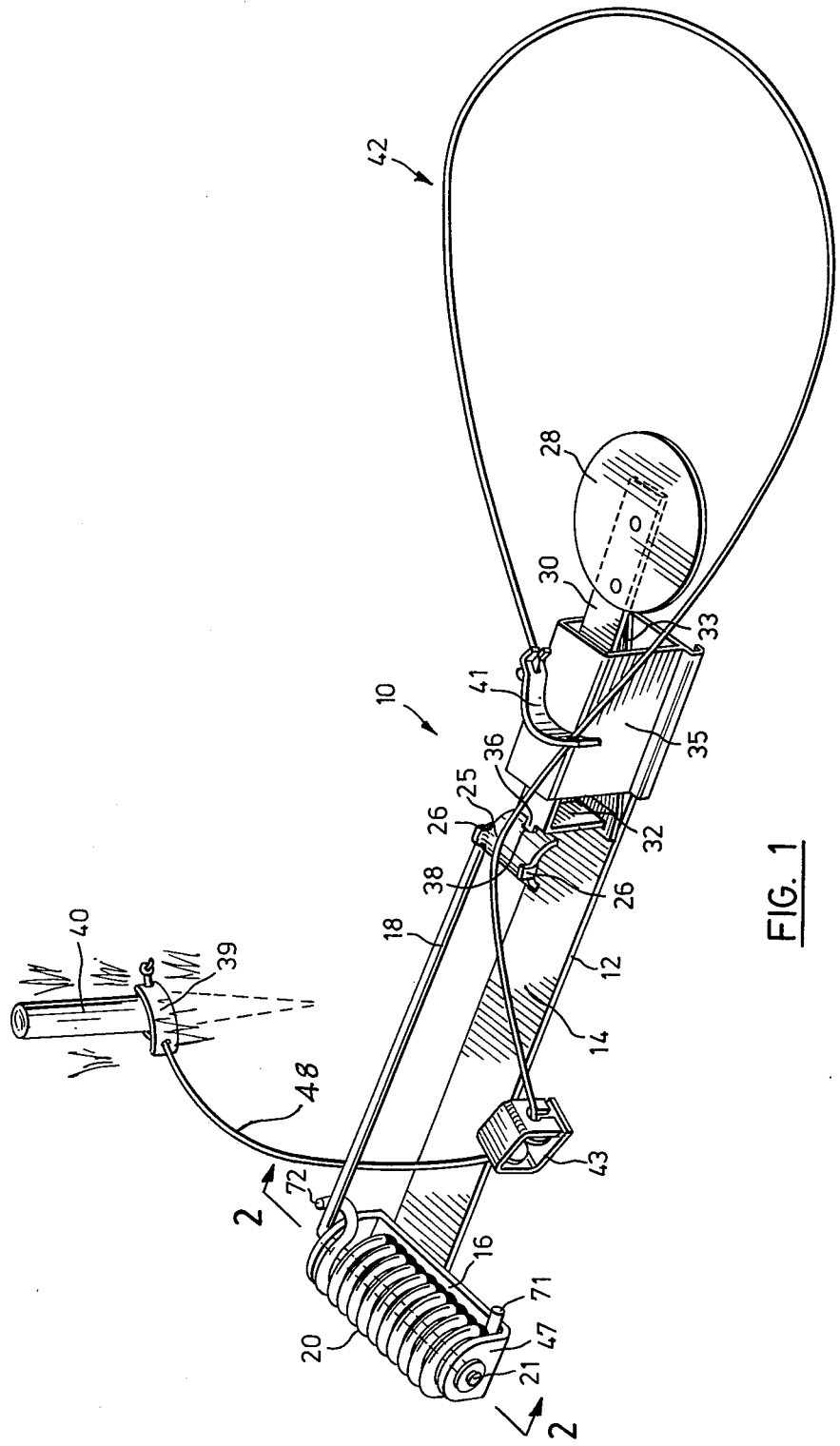

United States Patent [19]

Novak et al.

[11] 4,286,404
[45] Sep. 1, 1981

[54] TRAP CONSTRUCTION

[75] Inventors: Milan Novak, Aurora; William F. Adams, Barrie, both of Canada

[73] Assignee: Her Majesty the Queen in right of Canada, as represented by the Minister of Natural Resources, Toronto, Canada

[21] Appl. No.: 118,843

[22] Filed: Feb. 5, 1980

[30] Foreign Application Priority Data

Jan. 11, 1980 [CA] Canada ................................. 343541

[51] Int. Cl.³ .......................................... A01M 23/34
[52] U.S. Cl. ......................................... 43/87; 267/155
[58] Field of Search ...................... 43/77, 81, 81.5, 82, 43/83, 83.5, 85–95; 267/58, 155, 170, 173, 174, 179

[56] References Cited

U.S. PATENT DOCUMENTS

| 1,052,398 | 2/1913 | Woods | 43/87 |
|---|---|---|---|
| 2,823,413 | 2/1958 | Stewart | 267/155 X |
| 2,894,352 | 7/1959 | McDonald | 43/87 |
| 3,014,712 | 12/1961 | Reeves | 267/58 |
| 3,060,623 | 10/1962 | Aldrich | 43/87 |
| 3,084,950 | 4/1963 | Ross | 267/58 X |
| 4,180,937 | 1/1980 | Webster | 43/87 |

FOREIGN PATENT DOCUMENTS 209565 12/1955 Australia ..................................... 43/87

Primary Examiner—Stephen G. Kunin
Assistant Examiner—Robert P. Olszewski
Attorney, Agent, or Firm—Sim & McBurney

[57] ABSTRACT

There is provided an animal trap construction, in which a coil spring is adapted, upon springing of the trap, to cause a swing arm to pivot upwardly through a vertical arc, and tighten a noose around the leg of an animal. The coil spring is contained between two upstanding brackets, and an end portion of the swing arm, bent at right angles to the latter, passes centrally through the spring, and passes through the two brackets. A first bushing of cylindrical form is fixed within the end of the spring remote from the bend location between the swing arm and its end portion, the first bushing having a smaller-diameter cylindrical extension passing through an aperture in the respective bracket. A second bushing is provided at the other end of the coil spring, the second bushing having a flange which is adapted to be located between the coil spring and the respective bracket. The end portion of the swing arm passes through both bushings. The second bushing has a rib of annular form, extending toward and contacting the respective bracket, in order to reduce friction between the second bushing and its respective bracket.

6 Claims, 2 Drawing Figures

TRAP CONSTRUCTION

This invention relates generally to animal traps in which a swing arm is pivoted to be sprung when the animal triggers the trap, the arm swinging upwardly through an arc under the urging of a coil spring, and in doing so tightening a cable or wire around the leg of the animal. More particularly, this invention relates to the provision of a particular trap construction involving the coil spring and the pivotal location for the arm, which is superior to those conventionally known, and which reduces the tendency for the coil spring to bind against the parts of the trap frame which hold and support the spring.

Accordingly, this invention provides, in an animal trap having a frame and an arm which is adapted to swivel about an axis normal to its longitudinal extend under the urging of a coil spring encircling an axis member joined to the arm and disposed substantially at right angles thereto to define the said axis, the axis member extending through a first bracket member fixed to the frame and toward a second bracket member fixed to the frame, the improvement comprising:

two bushings, one bushing receiving the end of said axis member which is remote from the joined location, said one bushing being configured as a cylinder whose outer diameter is at least 75% of the inner diameter of the spring, the cylinder being received within one end of the coil spring and having a coaxial cylindrical extension at one end which is received within an aperture in said second bracket, the other bushing having a cylindrical body whose outer diameter is at least 75% of the inner diameter of the spring, said cylindrical body being received within the outer end of the coil spring, a flange extending radially outwardly from one end of the cylindrical body, the flange being interposed between said coil spring and said first bracket, said other bushing having a central bore receiving said axis member, and means smaller in diameter than said cylindrical body spacing the cylindrical body from said first bracket.

Further, this invention provides an animal trap comprising:
a frame,
first and second upstanding spaced-apart bracket members fixed to said frame,
an arm adapted to swivel about an axis normal to its length, the axis passing through said bracket members,
the arm having an end portion bent substantially at right angles to define said axis,
a coil spring encircling said end portion between said bracket members and adapted to urge said arm to swing in one direction,
means for releasably retaining the swinging end of said arm in a position in which said spring is under stress,
second means by which an animal can release the swinging end of said arm to swing under the urging of said spring,
cable means defining a slip-noose which is adapted to be tightened as the arm swings under the urging of said spring,
a first bushing receiving the end of said bent end portion which is remote from the bend location, said first bushing being configured as a cylinder whose outer diameter is at least 75% of the inner diameter of the coil spring, the cylinder being received within one end of the coil spring and having a coaxial cylindrical extension at one end which is received within an aperture in said second bracket, and a second bushing having a cylindrical body whose outer diameter is at least 75% of the inner diameter of the spring, said cylindrical body being received within the other end of the coil spring, a flange extending radially outwardly from one end of the cylindrical body, the flange being interposed between said coil spring and said first bracket, said second bushing having a central bore receiving said end portion of the arm, and means smaller in diameter than said cylindrical body spacing the cylindrical body from said first bracket.

Figure 2:
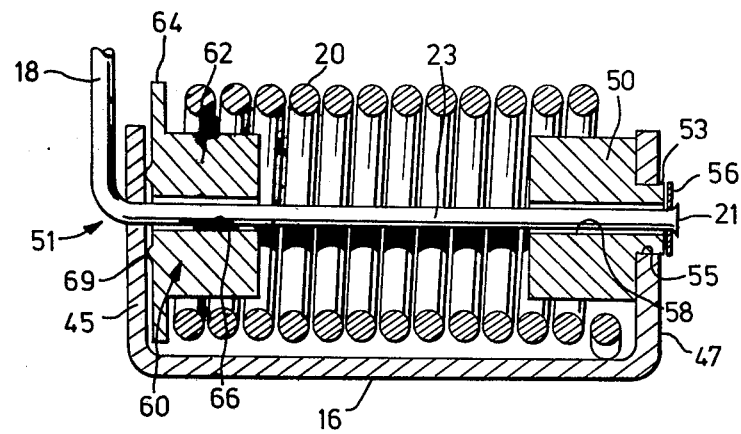

One embodiment of this invention is illustrated in the accompanying drawings, in which like numerals denote like parts throughout the several views, and in which:

FIG. 1 is a perspective view of an animal trap to which this invention is applicable; and FIG. 2 is a sectional view taken on the line 2—2 in FIG. 1.

In FIG. 1, an animal trap generally shown at the numeral 10 is seen to include a frame 12 consisting of an elongated member 14 and a transverse member 16.

A swing arm 18 is adapted to swivel vertically about a horizontal axis which is normal to its longitudinal extent, under the urging of a coil spring 20 which encircles an end portion of the arm of which only the actual end is visable at 21 in FIG. 1. In FIG. 2 the entire end portion is seen at 23. The end portion 23 of the swing arm 18 is bent substantially at right angles to the latter, in order to define the axis mentioned earlier.

At the rightward or forward end of the swing arm 18, as seen in FIG. 1, the swing arm 18 supports a saddle 25 which is cylindrically curved with the axis of the cylinder lying horizontal and transverse to the elongated member 14. the saddle 25 has two upstanding guide tabs 26. At the forward or rightward end of the elongated member 14, a trip pan 28 is mounted on a supporting bracket 30 which extends rearwardly and then downwardly through a right-angle bend to define a downward leg 32. Downward leg 32 is pivoted with respect to the elongated member 14, by virtue of a construction in which a narrower extension of the downward leg 32 passes downwardly through a transverse slot in the elongated member 14, and is held in engagement with the slot by virtue of a pin (not shown) passing through an aperture in the extension at a location underneath the elongated member 14. A flat spring member 33 also has a slot (not visible in FIG. 1) through which the extension at the bottom of the downward leg 32 passes. The rightward or forward end of the flat spring member 33 bears upwardly against the underside of the bracket 30 close to the trip pan 28, and manually adjustable means (not shown) are located under a mid region of the flat spring member 33, adapted to urge upwardly at the mid region, and thereby cause the flat spring member 33 to put an upward bias on the bracket 30. By virtue of this construction, it will require a certain weight of animal to depress the trip pan 28. In the embodiment shown in FIG. 1, a protective housing 35 covers the central portion of the flat spring member 33, and the previously mentioned manual adjustment means is not visible.

At the leftward end of the horizontal part of the bracket 30, a leftward or rearward tab 36 is adaped to enter and engage an aperture 38 in the saddle 25. The latter engagement retains the swing arm 18 in the position shown in FIG. 1 until a sufficient weight is exerted downwardly on the trip pan 28, thus rotating the bracket 30 about its pivotal connection with the elongated member 14, thus withdrawing the tab 36 from the aperture 38, thus releasing the swing arm 18 to swing in the counter-clockwise direction upwardly (in the vertical plane) as seen in FIG. 1, under the urging of the coil spring 20.

A cable 48 is provided, having means 39 at one end for securement to a stake 40 or other suitable anchoring means, and having a slide member 41 at the other end, the slide member defining an aperture through which an intermediate part of the cable 48 passes, thus defining a noose 42, which is adapted to tighten on the foot of an animal. A swivel and release connector 43 is provided in the embodiment of FIG. 1, the function of which is to allow mutual swivelling of two cable portions which together make up the complete cable, and also to allow the two portions to separate from each other, in the case of the entrapment of an animal larger than that for which the trap is intended.

As the swing arm swings upwardly after release, it entrains and pulls tight the cable which can be seen lying over the saddle 25 in FIG. 1. This will tighten the noose on the leg of an animal who has depressed the trip pan 28.

The structure to the right in FIG. 1, including the cable 48 and the connector 43, do not form an essential part of this invention, but has been described for the sake of completion.

This invention relates particularly to structure relating to and enclosed by the coil spring 20, which is not clearly visible in FIG. 1 but which may be seen in FIG. 2, to which attention is now directed.

The transverse member 16, which forms part of the frame 12, is bent at right angles upwardly at either end to define a first bracket 45 and a second bracket 47. The two brackets are parallel, upstanding, and spaced apart. As can be seen in FIG. 2, a first bushing 50 is provided, which receives the end of the bent end portion 23 of the swing arm 18 which is remote from the bend location 51. The first bushing 50 is configured as a cylinder whose outer diameter is at least 75% of the inner diameter of the coil spring 20, and as can be seen in FIG. 2 the cylinder of the first bushing 50 is received within the rightward end of the coil spring. The first bushing 50 has a coaxial cylindrical extension 53 at the rightward end, the extension being received within an aperture 55 in the second bracket 47. In the embodiment illustrated, the coaxial cylindrical extension 53 on the first bushing 50 is a tight fit within the aperture 55, and the rightward face of the first bushing 50 is tight against the second bracket 47. As can be seen in FIG. 2, the remote end 21 of the bent end portion 23 is fitted with a washer 56, and after the washer has been put into place, the extreme end 21 is distorted by flattening, so that the washer 56 cannot be removed. The end portion 23 passes through a central bore 58 in the first bushing 50, and the washer 56 has a larger diameter than the bore 58, for which reason the end portion 23 cannot be withdrawn leftwardly through the first bushing 50. This construction effectively anchors the swing arm 18 in place with respect to the transverse member 16 forming a part of the frame 12.

A second bushing 60 is also provided, the second bushing having a cylindrical body 62 whose outer diameter is at least 75% of the inner diameter of the coil spring 20. The cylindrical body 62 is received within the leftward end of the coil spring 20, as can be seen in FIG. 2, and the second bushing 60 further includes a flange 64 which extends radially outwardly from the leftward end of the cylindrical body 62, the flange 64 being interposed between the coil spring 20 and the first bracket 45. The second bushing 60 has a central bore 66 which receives the end portion 23 of the swing arm 18, and the second bushing 60 further includes means smaller in diameter than the cylindrical body 62, which means spaces the cylindrical body 62 from the first bracket 45. In the embodiment illustrated, the last mentioned means is constituted by an annular rib 69 on the cylindrical body 62, the rib 69 being concentric with the bore 66 within the cylindrical body 62, and extending from the end where the flange 64 is located. Thus, the annular rib 69 constitutes a buffer which allows rotation of the second bushing 60, with reduced frictional drag. In other words, the drag interfering with rotation of the bushing 60 is less than it would be if the rib 69 were absent.

It will be understood that the rib 69 could be replaced by a small-diameter washer, or other means for the purpose of reducing friction between the bushing 60 and the bracket 45.

When the swing arm 18 is placed under tension and locked into the position shown in FIG. 1, the coil spring 20 is stressed. In stressing the coil spring 20, the same is caused to distort and to depart from its strictly cylindrical configuration. The spring 20 tends to bear against the two bushings 50 and 60 during this stressing of the coil spring 20 while the trap is being set. Although the rightward end of the spring 20 does not undergo rotation of a significant degree, the leftward end, that surrounding the bushing 60, does rotate through something on the order of 180°, and because of the forces exerted, the spring tends to cause the bushing 60 to rotate along with it. It is for this reason that frictional drag between the bushing 60 and the bracket 45 should be reduced, and this is the function of the rib 69, as aforesaid.

As can be seen in FIG. 1, the end 71 of the coil spring closest to the bracket 47 simply bears downwardly against the transverse member 16, while the other end 72 of the coil spring 20 is bent into a hook configuration and is adapted to hook around the swing arm 18.

We claim:

1. In an animal trap having a frame and an arm which is adapted to swivel about an axis normal to its longitudinal extent under the urging of a coil spring encircling an axis member joined to the arm and disposed substantially at right angles thereto to define the said axis, the axis member extending through a first bracket member fixed to the frame and toward a second bracket member fixed to the frame, the improvement comprising:

two bushings, one bushing receiving the end of said axis member which is remote from the joined location, said one bushing being configured as a cylinder whose outer diameter is at least 75% of the inner diameter of the spring, the cylinder being received within one end of the coil spring and having a coaxial cylindrical extension at one end which is received within an aperture in said second bracket, the other bushing having a cylindrical body whose outer diameter is at least 75% of the inner diameter of the spring, said cylindrical body being received within the other end of the coil spring, a flange extending radially outwardly from one end of the cylindrical body, the flange being interposed between said coil spring and said first bracket, said other bushing having a central bore receiving said axis member, and means smaller in diameter than said cylindrical body spacing the cylindrical body from said first bracket.

2. The invention claimed in claim 1, in which said last-mentioned means is an annular rib on the cylindrical body concentric with the bore therein and extending from the end where said flange is located.

3. The invention claimed in claim 1 or claim 2, in which the coaxial cylindrical extension on said one bushing is a tight fit within said aperture in the second bracket.

4. An animal trap comprising:

a frame first and second upstanding spaced-apart bracket members fixed to said frame, an arm adapted to swivel about an axis normal to its length, the axis passing through said bracket member, the arm having an end portion bent subtantially at right angles to define said axis, a coil spring encircling said end portion between said bracket members and adapted to urge said arm to swing in one direction, means for releasably retaining the swinging end of said arm in a position in which said spring is under stress, second means by which an animal can release the swinging end of said arm to swing under the urging of said spring, cable means defining a slip-noose which is adapted to be tightened as the arm swings under the urging of said spring, a first bushing receiving the end of said bent end portion which is remote from the bend location, said first bushing being configured as a cylinder whose outer diameter is at least 75% of the inner diameter of the coil spring, the cylinder being received within one end of the coil spring and having a coaxial cylindrical extension at one end which is received within an aperture in said second bracket, and a second bushing having a cylindrical body whose outer diameter is at least 75% of the inner diameter of the spring, said cylindrical body being received within the other end of the coil spring, a flange extending radially outwardly from one end of the cylindrical body, the flange being interposed between said coil spring and said first bracket, said second bushing having a central bore receiving said end portion of the arm, and means smaller in diameter than said cylindrical body spacing the cylindrical body from said first bracket.

5. The trap claimed in claim 4, in which said last-mentioned means is an annular rib on the cylindrical body concentric with the bore therein and extending from the end where said flange is located.

6. The trap claimed in claim 4 or claim 5, in which the coaxial cylindrical extension on said first bushing is a tight fit within said aperture in the second bracket.

* * * * *